Aug. 31, 1965 L. E. CLEMENTS 3,204,027

CONTRAST CONTROL CIRCUIT

Filed Dec. 20, 1962

INVENTOR.
Louis E. Clements,
BY Hood, Gust & Irish
Attorneys.

3,204,027
Patented Aug. 31, 1965

3,204,027

CONTRAST CONTROL CIRCUIT

Louis E. Clements, Fort Wayne, Ind., assignor to International Telephone and Telegraph Corporation, Nutley, N.J., a corporation of Maryland Filed Dec. 20, 1962, Ser. No. 246,198
1 Claim. (Cl. 178—7.3)

This invention relates generally to systems for transmitting a variable amplitude signal having a maximum variation between two extremities which are respectively independently variable in level, such as a television video signal, and more particularly to a circuit for providing such a signal with a predetermined constant maximum variation between first and second extremities having predetermined fixed potential levels.

Conventional television systems transmit a picture which is a fairly accurate reproduction of the various shades of gray in the original image. However, when a television system is employed for transmitting pictures of documents such as drawings, typewritten letters, bank signatures cards, etc., it may be desired that the picture be displayed in only black and white, i.e., white for the background and black for the lines and letters, with no intermediate shades of gray. However, documents are printed on paper having a wide variety of colors and the printing or handwriting may also be in ink having a wide variety of colors and thus a wide range of combinations of paper color and ink color are possible, which in a conventional television system would provide a correspondingly wide range of contrast and background brightness.

In a television system specifically designed for the transmission of pictures of documents, it may be desirable to employ a vidicon camera tube, however, all vidicon tubes are sensitive to variations in color. For example, the WL7290 vidicon has a peak sensitivity in the blue region (4,000 to 5,000 A.) with the relative response outside of these limits dropping off rapidly; in the yellow region, (6,000 A.), the relative response is about 5% of the peak response. Such a video signal, in common with other video signals, has a maximum amplitude variation between two extremities, i.e., a "white" level and a "black" level. However, the white level will vary from one document to the next in response to the different paper or background colors, and likewise the black level will vary in response to the different colored inks employed. Therefore, in order to provide a black on white display image without intermediate shades of gray regardless of the colors of the ink and paper employed for the document, it is desirable to provide a circuit which will provide a fixed reference level for the white level of the video signal, regardless of its initial level, and a fixed level for the black level of the signal, again without regard to its initial level.

It is accordingly an object of the invention to provide a circuit for converting a variable amplitude signal having a maximum variation between two extremities which are respectively independently variable in level into a signal having a predetermined constant maximum variation between first and second extremities having predetermined fixed potential levels.

Another object of the invention is to provide an improved contrast and brightness control circuit for a television system.

The invention in its broader aspects provides means for clamping to a first predetermined fixed potential one of the extremities of a variable amplitude signal which has a maximum variation between two extremities which are respectively independently variable in level whereby the signal varies with a predetermined polarity from the first potential and means for clipping the signal at a second predetermined potential of the said polarity.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
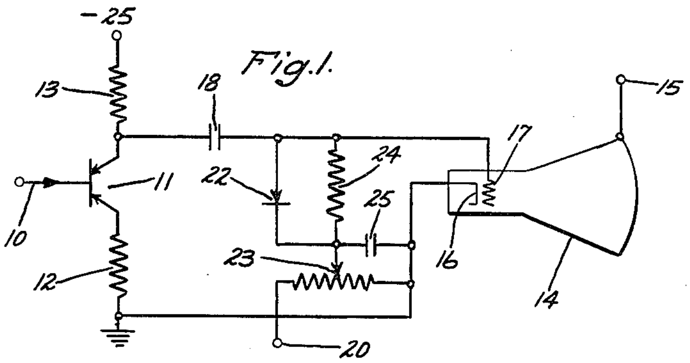
FIG. 1 is a schematic diagram of the circuit of the invention incorporated in the receiver of a television system.

Referring now to FIG. 1, the demodulated video signal having a positive-going amplitude variation for black is received by the input circuit 10 and applied to the base of transistor 11 having its emitter connected to ground by resistor 12 and having its collector connected to a suitable source of potential, such as —25 volts by resistor 13. The incoming black positive video signal is thus inverted and appears at the collector of transistor 11 as a black negative signal. A conventional cathode ray tube 14 is provided having its anode connected to a suitable source 15 of high voltage, its cathode 16 connected to ground, and its control grid 17 coupled to the collector of transistor 11 by coupling capacitor 18; suitable beam forming, accelerating, focusing and deflection elements are also provided as is well known to those skilled in the art. Potentiometer 19 is coupled between ground and a suitable source 20 of negative potential. A diode 22 is provided connected between the control gride 17 of the display tube 14 and the adjustable element 23 of potentiometer 19. Resistor 24 is connected across the diode 22 and a suitable capacitor 25 couples the adjustable element 23 to ground, as shown.

Figure 3:
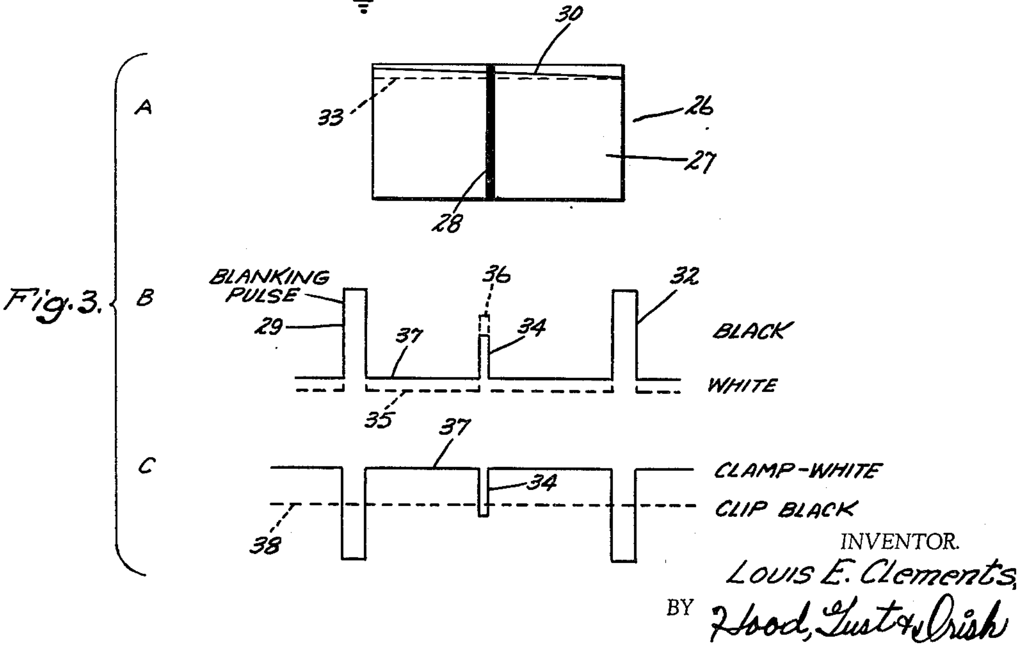
FIG. 3 is a diagram useful in explaining the mode of operation of the invention.

Referring now additionally to FIG. 3, it is assumed that the camera is viewing a document 26 having a light background color 27 and a dark stripe 28 thereon. Line blanking pulse 29 initiates scanning line 30 while the next blanking pulse 32 resets the sweep, as shown by the dashed retrace line 33, and initiates a new horizontal scanning line, as will be well known to those skilled in the art.

It is assumed that maximum contrast is provided between the light background color 27 and the dark stripe 28, and thus the video signal will have a minimum amplitude level 37 when the camera tube is scanning the background color 27 and a maximum, in this case positive-going, amplitude 34 when the dark stripe 28 is scanned. However, as previously indicated, different documents 26 having different background colors 27 will provide different white levels in the video signal, as indicated, for example, by the dashed line 35, and furthermore different colored inks will provide different black levels, as shown by the dashed line 36. It is thus seen that while the variable amplitude video signal has, for any given document with a given color paper and ink, a maximum variation between the white and black level extremities, these two level extremities are independently variable in level, depending on the particular background color 27 and the particular color ink 28.

As seen in FIG. 3C, the black positive video signal of FIG. 3B is inverted at the collector of transistor 11 to be black negative. Assuming now that the adjustable element 23 of potentiometer 19 is adjusted to provide a potential of —10 volts, it will be seen that whenever the white level of the video signal tends to become more positive than —10 volts, the diode 22 will conduct thus clamping the potential of the control grid 17 of the display tube 14 to —10 volts. Thus, the white level 37 of the video signal appears across capacitor 18 and does not bias the control grid 17 which is clamped to the voltage selected by the adjustable element 23, thereby providing the desired degree of brightness for the background color 27 on the display tube 14. Resistor 24 has a rather large value and in conjunction with capacitor 18 provides a relatively long time constant compared to the duration of a black picture element, 28. Therefore, the charge on capacitor 18 does not change appreciably during the black negative excursions which are described below.

It will further be seen that whenever the video signal tends to go negative with respect to the potential level selected by the adjustable element 23 of the potentiometer 19 (the signal is permitted to go negative by virtue of the provision of the coupling capacitor 18), the diode 22 is blocked (or non-conducting) and the negative excursion of the video signal appears across resistor 24 and is applied to control grid 17 of the display tube 14. In this manner, a bias voltage is developed for the control grid 17 which biases the electron beam to or beyond cut-off, i.e., to provide a dark image on the display screen. The video signal 10 is amplified by transistor 11 a sufficient amount so that the black level signal always drives the control grid 17 below cut-off at a predetermined negative potential with respect to the clamping level 37, such as −15 volts as shown by the dashed line 38 in FIG. 3C. Thus, it will be seen that the black signal 34 responsive to the stripe 28 will always drive the control grid 17 to or beyond cut-off thus extinguishing the beam to provide a black image on the display screen.

It will now be seen that by clamping the white level of the video signal to the first fixed potential level which will provide the desired degree of brightness, i.e., whiteness on the display screen, and by clipping the black signal at a second predetermined potential, the resulting image on the display screen is only black and white, i.e., white for the background color and black for the lines or letters, with no intermediate shades of gray being displayed.

While FIG. 1 shows the circuit of the invention incorporated at the receiver, it may be found desirable to incorporate the circuit at a transmitter rather than at the receiver.

Figure 2:
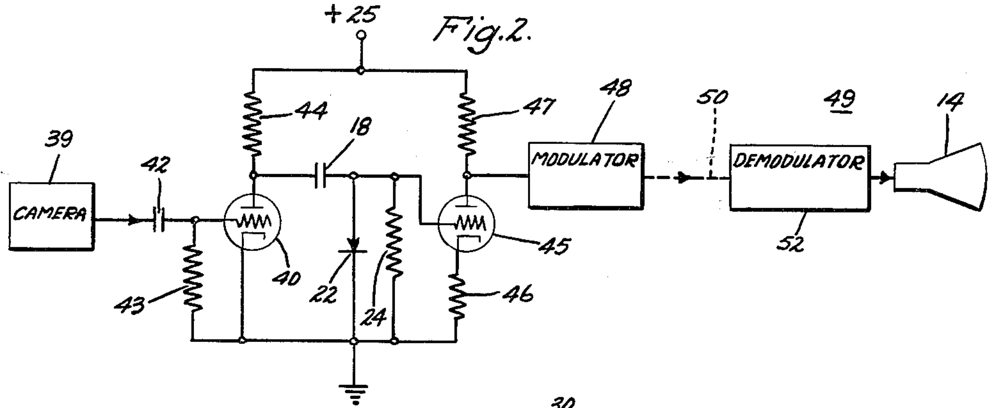
FIG. 2 is a schematic diagram of the circuit of the invention incorporated in the transmitter of a television system.

Referring now to FIG. 2, such an application of the circuit of the invention is shown wherein a conventional camera tube 39, such as a vidicon tuge, is provided having its output circuit coupled to the control grid of a vacuum tube 40 by coupling capacitor 42. Bias resistor 43 connects the control grid of tube 40 to ground, as shown, and the plate of tube 40 is connected to a suitable source of potential such +25 volts by plate resistor 44. Tube 40 together with resistors 43, 44, thus functions as a high-gain amplifier and inverter, the black positive video signal of FIG. 3B applied to the grid being amplified and inverted to provide the black negative signal of FIG. 3C at the plate of tube 40.

Vacuum tube 45 is provided having its control grid coupled to the plate of tube 40 by coupling capacitor 18, its cathode connected to ground by resistor 46, and its plate connected to the +25 volt source by resistor 47. In this embodiment, wherein it is desired to clamp the white level of the video signal directly to ground, diode 22 connects the control grid of tube 45 directly to ground and resistor 24 is connected between the control grid of tube 45 and ground, as shown.

The plate of tube 45 is coupled to modulator 48, the resulting modulated signal being transmitted to the receiver 49 by a conventional transmission facility shown by the dashed lines 50, the received signal being suitably demodulated by demodulator 52 and displayed on the display tube 14.

It will be seen that the circuit of FIG. 2 functions in a manner identical to that shown in FIG. 1, the white level 37 of the inverted video signal being, however, clamped to ground, and the dark signal 34 being clipped at the desired potential level, such as about −1 volt. In this embodiment, the cathode and plate resistors 46, 47 of tube 45 are equal so that the gain of tube 45 is one. Tube 45, however, functions as another inverter so that the resulting signal appearing at its plate is black positive, however, with its white level clamped and its black level clipped.

In a specific embodiment of the circuit of FIG. 2, the following component values may be employed:

| | | |
|---|---|---|
| Tubes 40–45 | | 6112 |
| Resistor 43 | megohms | 2.2 |
| Resistor 44 | ohms | 39,000 |
| Capacitor 18 | mfd | .01 |
| Diode 22 | | 1N277 |
| Resistor 24 | megohms | 2.2 |
| Resistors 46, 47 | ohms | 22,000 |

It will now be seen that the invention provides a system which automatically compensates for differences in the background color and ink color in documents in order to provide a black and white display regardless of the background color and ink color.

While I have described above the principles of my invention in connection with specific apparatus, it is to be clearly understood that this description is made only by way of example and not as a limitation to the scope of my invention.

What is claimed is:

In a television system having a video signal with a maximum white level which is negative with respect to its maximum dark level, said white and dark levels being independently variable in amplitude: an automatic contrast control circuit comprising means for inverting said video signal whereby said white level is positive with respect to said dark level, valve means having rectifying elements and a current controlling element coupled to said inverting means by a coupling capacitor, a source of direct current potential one side of which is at a reference potential, said valve means rectifying elements being coupled across said source, rectifying means coupled across said control element and said one side of said source for conducting when the level of inverted signal tends to become positive with respect to said reference potential thereby clamping the white level of the inverted signal to said reference potential, and means including a resistor coupled across said control element and said one side of said source and having a voltage developed thereacross responsive to said inverted signal when the same is negative with respect to said reference potential for biasing said valve means out of conduction when the amplitude of said inverted video signal reaches a predetermined potential which is negative with respect to said reference potential.

References Cited by the Examiner

UNITED STATES PATENTS

| | | | |
|---|---|---|---|
| 2,724,738 | 11/55 | Babbs | 328—169 |
| 2,898,457 | 8/59 | Auerbach | 328—169 |
| 2,970,188 | 1/61 | Kroger | 178—7.3 |
| 2,999,127 | 9/61 | Fisher | 178—7.5 |

FOREIGN PATENTS

| | | |
|---|---|---|
| 754,611 | 8/56 | Great Britain. |
| 135,512 | 7/59 | Russia. |

OTHER REFERENCES

"N.S.B. Engineering Handbook," 5th edition, N.Y., McGraw-Hill, 1960, p. 4–162.

Lambourne, E. W.: Automatic Level Control, in "Electronics," July 1, 1957, pp. 182–183.

German application 1,118,820, Dec. 7, 1961.

DAVID G. REDINBAUGH, *Primary Examiner.*